(12) United States Patent
Asano

(10) Patent No.: US 10,073,414 B2
(45) Date of Patent: Sep. 11, 2018

(54) IMAGE FORMING APPARATUS WITH PRINTER UNIT AND AIR-COOLED READER UNIT

(71) Applicant: CANON KABUSHIKI KAISHA, Tokyo (JP)

(72) Inventor: Fumio Asano, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/490,603

(22) Filed: Apr. 18, 2017

(65) Prior Publication Data

US 2017/0308035 A1 Oct. 26, 2017

(30) Foreign Application Priority Data

Apr. 20, 2016 (JP) ................. 2016-084557

(51) Int. Cl.
G03G 15/00 (2006.01)
G03G 21/20 (2006.01)
G03G 15/20 (2006.01)
H04N 1/00 (2006.01)

(52) U.S. Cl.
CPC ....... *G03G 21/206* (2013.01); *G03G 15/2028* (2013.01); *H04N 1/00602* (2013.01); *H04N 1/00615* (2013.01); *H04N 1/00795* (2013.01)

(58) Field of Classification Search
CPC ............. G03G 21/206; G03G 15/2017; H04N 1/00602; H04N 1/00615; H04N 1/00795
USPC ........................................... 399/92
See application file for complete search history.

(56) References Cited

U.S. PATENT DOCUMENTS

| 5,860,042 A * | 1/1999 | Tomaru et al. .... H04N 1/00519 399/92 |
| 8,897,667 B2 * | 11/2014 | Yamanaka et al. .. G03G 21/206 399/92 |
| 9,609,161 B1 * | 3/2017 | Kitamura ........... H04N 1/00795 |
| 2013/0108309 A1 | 5/2013 | Yamanaka et al. ............. 399/92 |

FOREIGN PATENT DOCUMENTS

| JP | H11-341202 A | 12/1999 |
| JP | 2003-195434 A | 7/2003 |
| JP | 5570490 | 8/2014 |
| JP | 2015-041964 A | 3/2015 |

\* cited by examiner

*Primary Examiner* — William J Royer
(74) *Attorney, Agent, or Firm* — Fitzpatrick, Cella, Harper & Scinto

(57) ABSTRACT

An image forming apparatus includes a printer unit configured to form a toner image on a recording material, the printer unit including a fixing portion configured to heat-fix the toner image on the recording material; a reader unit provided above the printer unit and configured to read an image of an original, the reader unit including an image sensor configured to optically read the original; wherein in a side of the reader unit opposed to the printer unit, there are provided a suction opening configured to suck air from an outside of the reader unit and a discharging opening configured to discharge the air to an outside of the reader unit, and wherein an air flow path connecting the suction opening and the discharging opening overlaps with an entirety of the image sensor in a main scan direction which is an axial direction of the image sensor.

15 Claims, 5 Drawing Sheets

IMAGE FORMING APPARATUS WITH PRINTER UNIT AND AIR-COOLED READER UNIT

FIELD OF THE INVENTION AND RELATED ART

The present invention relates to an image reading apparatus which is suitable for an image forming apparatus. Further, it relates to an image forming apparatus such as an electrophotographic copying machine, an electrophotographic printer (laser beam printer, and LED printer, for example), a facsimileing machine, and the like.

In the field of an image reading apparatus, there has been known an apparatus equipped with an image sensor (image reading means) which is structured so that it reads an original by outputting a beam of light (laser light) in a manner to illuminate an original with the beam, and catching the light reflected by the original; it obtains the data of an original, as data of a preset number of linear pieces of the original, which are parallel to the direction in which the original is scanned. Further, there has been known an image forming apparatus equipped with an image reading apparatus such as the one described above.

An image reading apparatus such as the above described one suffers from the following issue. That is, as the image sensor of the apparatus increases in temperature, it thermally expands, reducing therefore in the level of accuracy at which it can read an original. Further, in the case of an image forming apparatus equipped with such an image reading apparatus as the above described one, the image sensor of the image reading apparatus is likely to increase in temperature by the heat generated in an image forming portion of the image forming apparatus, and the heat generated by a fixing portion of the image forming apparatus, in which an image is fixed to a sheet of recording medium. In particular, in a case where an image forming apparatus is reduced in overall height to reduce the apparatus in overall size, its image reading apparatus is disposed closer to the image forming portion of the image forming apparatus, and also, to the fixing portion of the image forming apparatus, making it more likely for the image sensor to be increased in temperature.

Thus, there have been proposed various structural arrangements to prevent an image reading apparatus from being reduced in the level of accuracy at which it can read an original, by the heat from the image forming portion and fixing portion of the image forming apparatus. For example, in the case of an image forming apparatus disclosed in Japanese Patent No. 5570490, it is provided with a combination of an air intake opening and an air exhaust opening, and is structured so that the theoretical air passage which connects the air intake opening and air exhaust opening, is in the adjacencies of the center of the image forming apparatus in terms of the primary scan direction of the image sensor. With the employment of this structural arrangement, the air mass taken into the image forming apparatus through the air intake opening is made to flow through the center portion of the image forming apparatus, in terms of the primary scan direction of the image reading apparatus, to prevent the image sensor from excessively increasing in temperature.

However, in the case of the structural arrangement disclosed in Japanese Patent No. 5570490, the image sensor is not cooled across its entire range in terms of the primary scan direction of the image reading apparatus. Thus, the image sensor (image reading apparatus) is likely to become nonuniform in temperature in terms of its primary scan direction. Therefore, it is likely to become nonuniform in the amount of thermal expansion in terms of its primary scan direction. If it becomes nonuniform in the amount of thermal expansion, it is possible that the image reading apparatus will reduce in accuracy due to the blurring attributable to the nonuniform expansion of an original and/or focal nonuniformity of the image sensor. That is, it is possible that the structural arrangement disclosed in Japanese Patent Application No. 5570490 will reduce an image reading apparatus in accuracy.

SUMMARY OF THE INVENTION

The present invention was made in consideration of the current state of the structural arrangement for an image reading apparatus described above. Thus, the primary object of the present invention is to provide an image reading apparatus which is capable of preventing its image reading means from becoming nonuniform in temperature in terms of its primary scan direction.

According to an aspect of the present invention, there is provided an image forming apparatus comprising a printer unit configured to form a toner image on a recording material, said printer unit including a fixing portion configured to heat-fix the toner image on the recording material; a reader unit provided above said printer unit and configured to read an image of an original, said reader unit including an image sensor configured to optically read the original; wherein in a side of said reader unit opposed to said printer unit, there are provided a suction opening configured to suck air from an outside of said reader unit and a discharging opening configured to discharge the air to an outside of said reader unit, and wherein an air flow path connecting said suction opening and said discharging opening overlaps with an entirety of said image sensor in a main scan direction which is an axial direction of said image sensor.

According to another aspect of the present invention, there is provided an image reader usable with a printer unit for forming a toner image on a recording material, the printer unit including a fixing portion configured to fix a toner image on the recording material, said image reader comprising a reader unit for being placed above the printer unit and configured to read an image of an original, said reader unit including an image sensor configured to optically read the original; and a suction opening provided in a side of the reader unit and configured to suck air from an outside of said reader unit and a discharging opening configured to discharge the air to an outside of said reader unit, wherein an air flow path connecting said suction opening and said discharging opening overlaps with an entirety of said image sensor in a main scan direction which is a longitudinal direction of said image sensor so that air can flow in the longitudinal direction of said image sensor.

Further features of the present invention will become apparent from the following description of exemplary embodiments with reference to the attached drawings.

Figure 3:
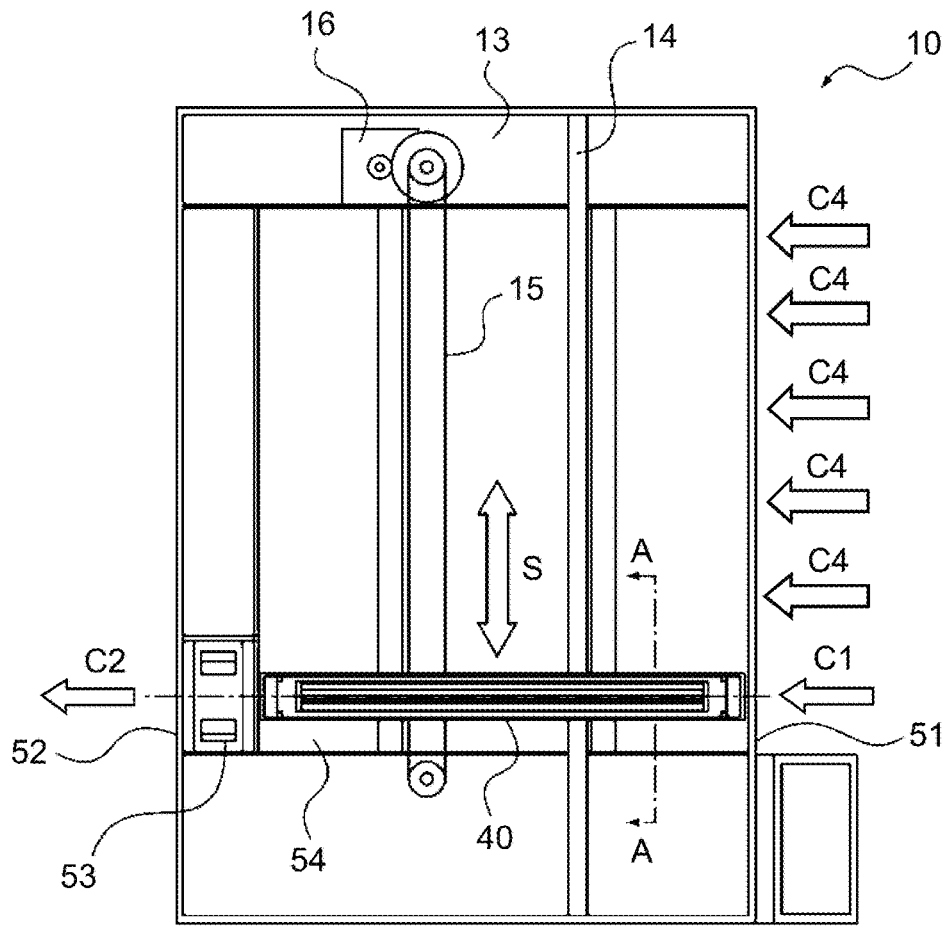
Figure 3:
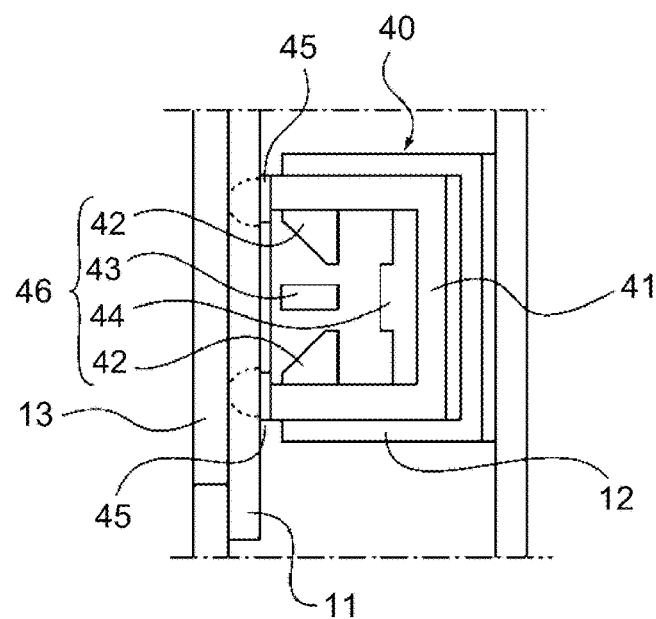

Parts (a) and (b) of FIG. 3 show a combination of a top view of the image reading apparatus in the first embodiment, and a sectional view of a sensor unit of the image reading apparatus in the first embodiment.

Figure 4:
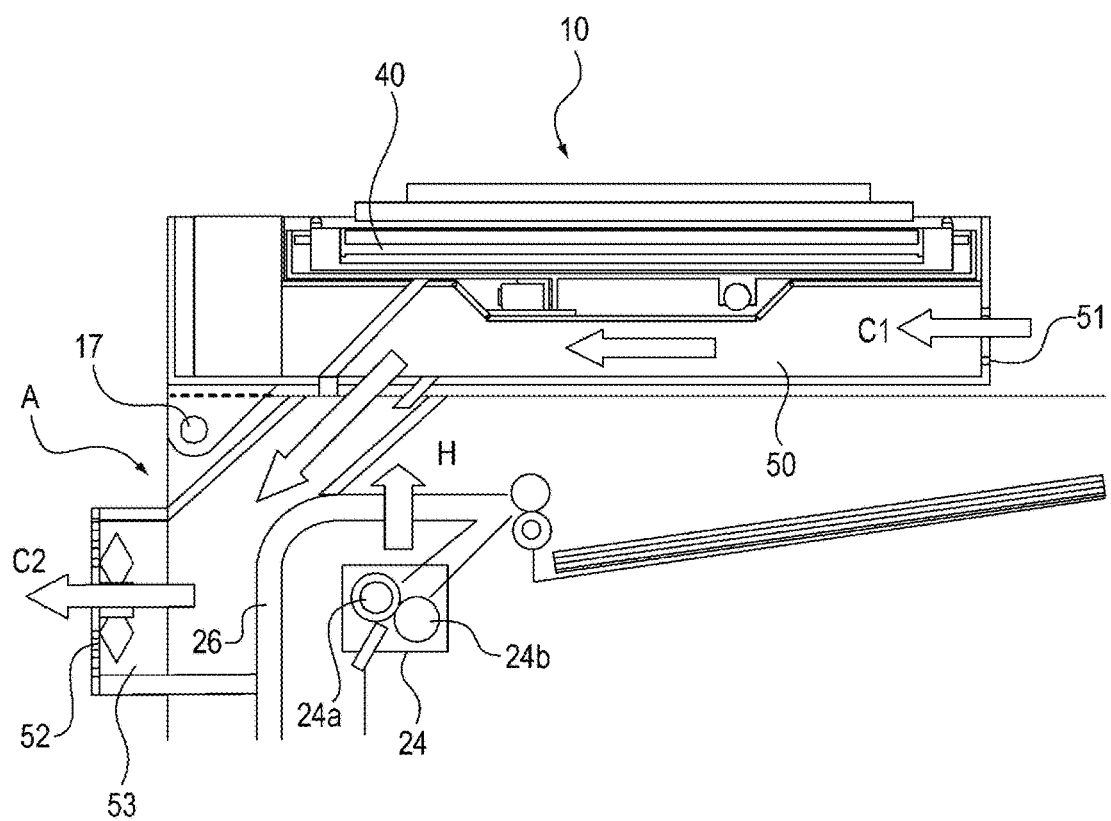

FIG. 4 is a schematic sectional view of the image reading apparatus in a second embodiment of the present invention.

Figure 5:
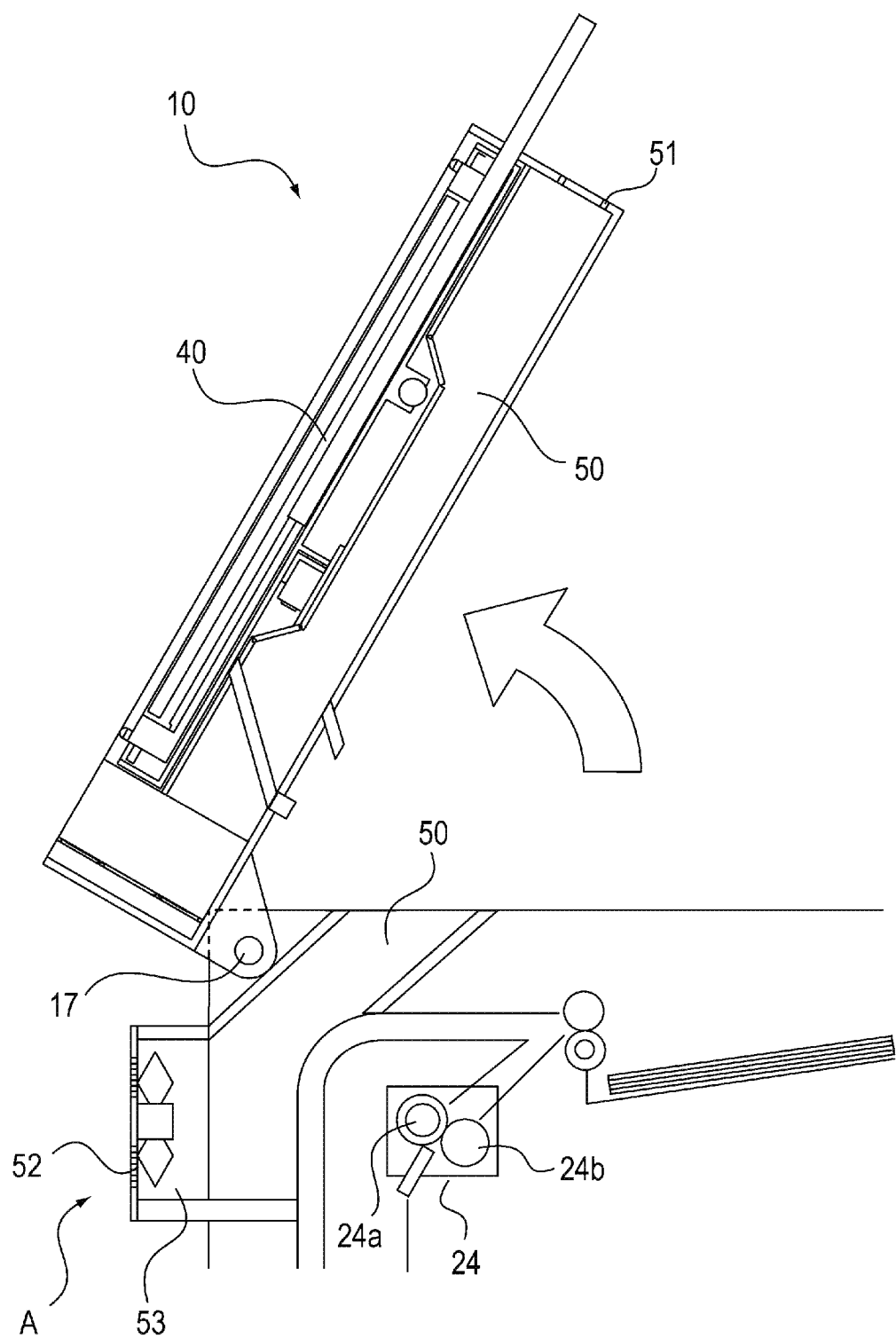

FIG. 5 also is a schematic sectional view of the image reading apparatus in the second embodiment.

DESCRIPTION OF THE EMBODIMENTS

Embodiment 1

<Image Forming Apparatus>

To begin with, an image forming apparatus A equipped with an image reading portion 10 (reader unit) in this embodiment is described about its overall structure, along with its image forming operation, with reference to the appended drawings. By the way, this embodiment is not intended to limit the present invention in scope in terms of the shapes of structural components of the image forming apparatus and the image reading portion, their positional relationship, and the like, unless specifically noted.

The image forming apparatus A is equipped with on the image reading portion 10 (reader unit) which reads an original, and a printer unit 100 which forms a toner image on a sheet of recording medium.

Figure 1:
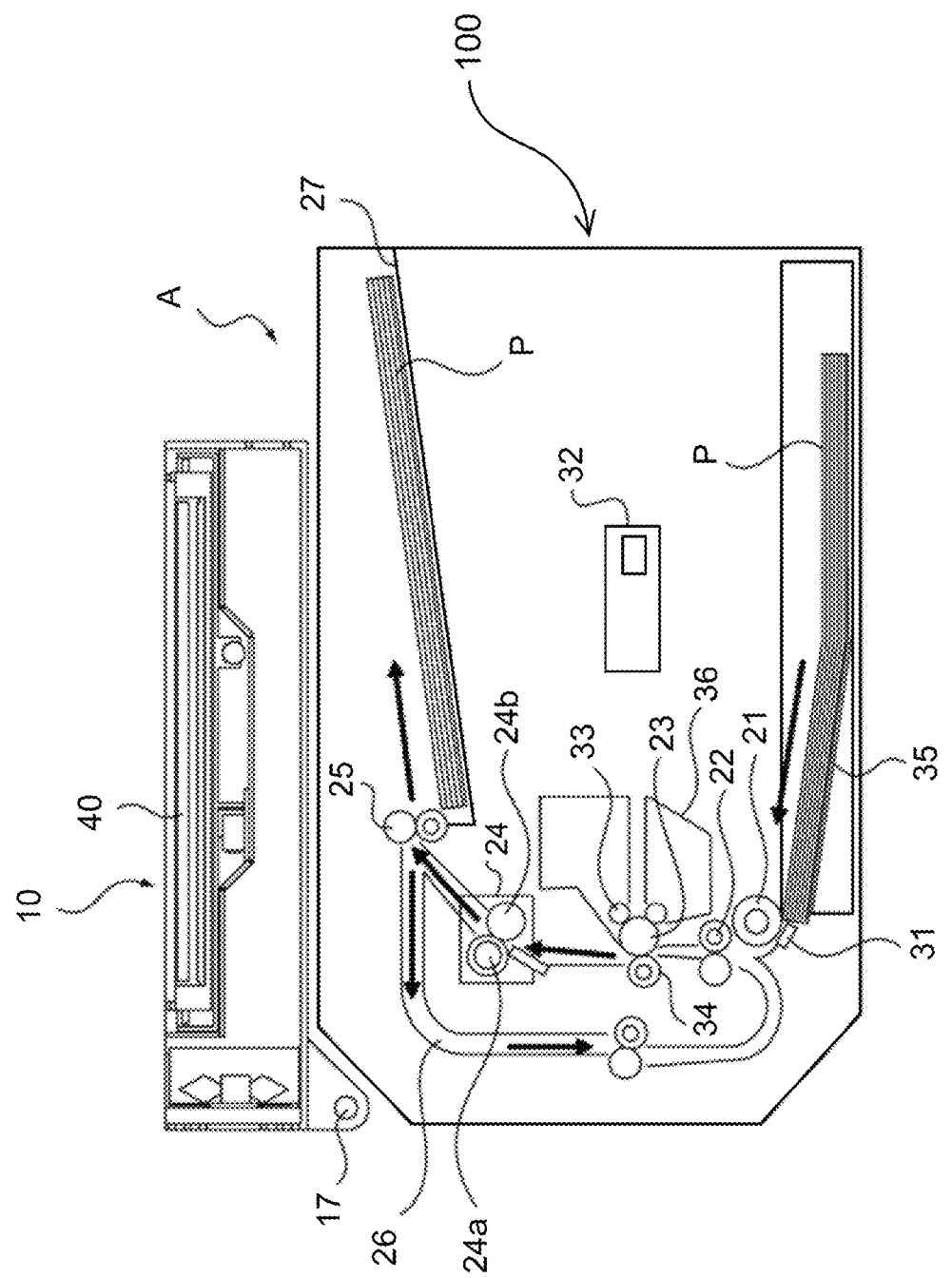
FIG. 1 is a schematic sectional view of an image forming apparatus in a first embodiment of the present invention.

Referring to FIG. 1, the printer unit 100 has a photosensitive drum 23 (image bearing member), a charge roller 33, an exposing apparatus 32, a developing apparatus 36, a transfer roller 34, and the like.

The aforementioned image reading portion 10 (reader unit) functions as an image reading portion. It reads an original. That is, it generates such data that reflects the original. It is disposed on top of the printer unit 100. More specifically, it is supported by a main assembly (printer unit 100) of the image forming apparatus A so that it can be pivotally moved upward or downward about a hinge portion 17, with which it is attached to the main assembly. As it is pivoted upward, it is opened relative to the main assembly, whereas as it is pivoted downward while it is open, it is closed relative to the main assembly. Further, it is attached to the main assembly in such a manner that when it is open, it remains stable in attitude.

An image forming operation of the image forming apparatus A is as follows: As an unshown control portion outputs a print signal, sheets P of recording medium stored in layers in a sheet storage portion 35 begin to be sent out one by one into a recording medium conveyance passage, by a combination of a feeder roller 21 and a separation pad 31, while being separated from the rest by being pinched between the feeder roller 21 and the separation pad 31. Then, each sheet P is sent to the image forming portion of the image forming apparatus A.

Meanwhile, in the image forming portion, charge bias begins to be applied to the charge roller 33, whereby the peripheral surface of the photosensitive drum 23, which is in contact with the charge roller 33, is charged.

Then, the exposing apparatus 32 outputs a beam of laser light from its internal light source (unshown) while modulating the beam according to the data of the original generated by the image reading portion 10. As the beam of laser light hits a given charged point of the uniformly charged area of the peripheral surface of the photosensitive drum 23, this point reduces in potential. Thus, as the uniformly charged portion of the peripheral surface of the photosensitive drum 23 is scanned by (exposed to) the beam of laser light, an electrostatic latent image, which reflects the image formation data of the original, is effected on the peripheral surface of the photosensitive drum 23.

Then, toner is adhered by the developing apparatus 36, to the electrostatic latent image formed on the peripheral surface of the photosensitive drum 23. Consequently, a toner image is formed on the peripheral surface of the photosensitive drum 23. Then, the toner image is sent by the rotation of the photosensitive drum 23 to a transfer nip portion formed between the photosensitive drum 23 and the transfer roller 34. As the toner image arrives at the transfer nip portion, a transfer bias which is opposite in polarity from the toner is applied to the transfer roller 34. Consequently, the toner image is transferred onto the aforementioned sheet P of recording medium.

After the transfer of the toner image onto the sheet P of recording medium, the sheet P is sent to a fixing device 24 as a fixing portion, and is conveyed through a fixation nip portion formed between a pressing portion 24a and a heating portion 24b of the fixing device 24. As the sheet P is conveyed through the fixation nip portion, the sheet P and the toner image thereon are heated and pressed. Consequently, the toner image becomes fixed to the sheet P. Then, the sheet P is conveyed further, and then, is discharged into a delivery tray 27 by a pair of discharge rollers 25.

By the way, in an operation in which an image is to be formed on both surfaces of a sheet P of recording medium, after the fixation of an image on one (first) of the two surfaces of the sheet P, the sheet P is conveyed toward the delivery tray 27 by the pair of discharge rollers 25. Then, before the trailing end of the sheet P passes the discharge rollers 25, the pair of discharge rollers 25 begin to be rotated in reverse so that the sheet P is conveyed in the opposite direction. Thus, the sheet P is conveyed through a two-sided image formation sheet passage 26, to be conveyed to conveyance rollers 22, while being kept upside down. The process through which the sheet P is put thereafter is the same as the process through which it was put to form an image on its first surface.

<Image Reading Portion (Reader Unit)>

Figure 2:
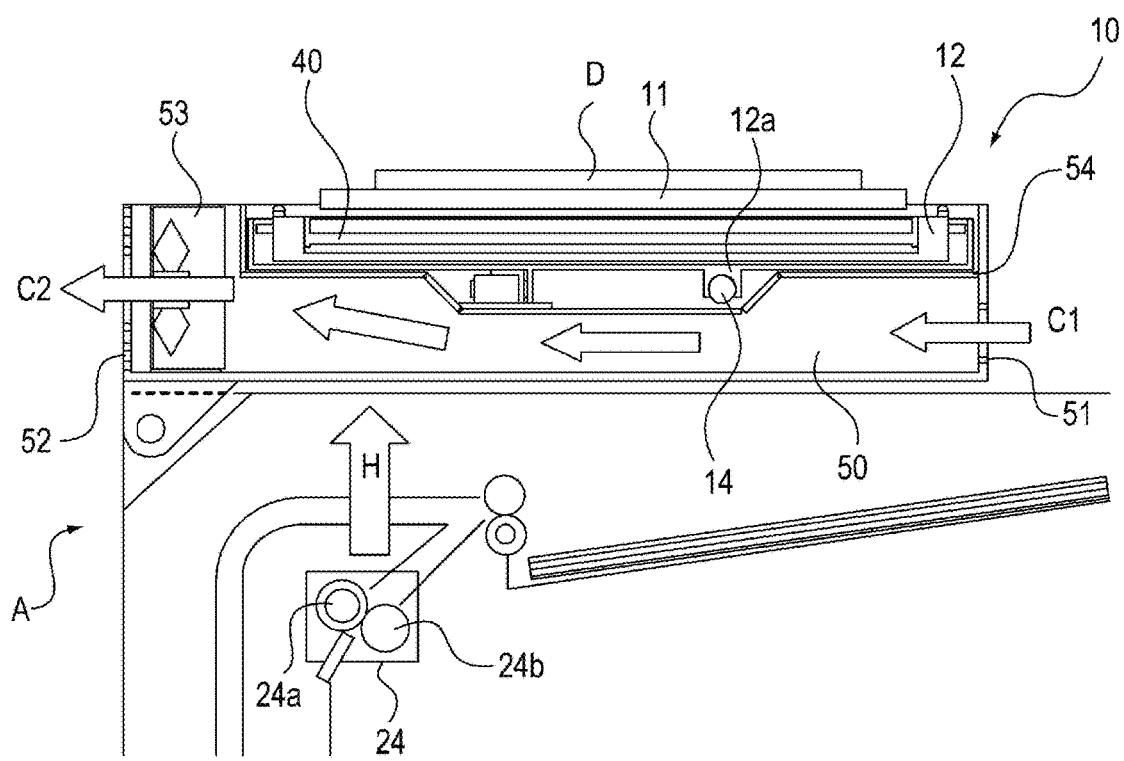
FIG. 2 is a schematic sectional view of an image reading apparatus in the first embodiment.

Next, the structure of the image reading portion 10 is described in detail. FIG. 2 is a sectional view of the image reading portion 10. Part (a) of FIG. 3 is a top view of the image forming portion 10, and part (b) of FIG. 3 is a sectional view of a sensor unit 40 of the image reading portion 10, at a plane A-A in part (a) of FIG. 3.

The image reading portion 10 in this embodiment is an image scanner which employs an image sensor of the contact type. Referring to FIGS. 2 and 3(a), the image reading portion 10 has a frame 13 (casing), an original placement glass platen 11 fixed to the frame 13, a guide frame 12, the sensor unit 40, a guide shaft 14, a timing belt 15, and the like.

Referring to part (b) of FIG. 3, the sensor unit 40 has an image sensor 46 (image reading means), which has: an LED 42 (light source), a cylindrical lens 43, and a light sensing element 44, which are roughly in the same plane which is perpendicular to the primary scan direction of the sensor unit 40. It has also a sensor frame 41 which supports the image sensor 46. Further, it has a contacting member 45 which has hemispherical contacting portions, which are at the lengthwise ends of the sensor unit 40, one for one, in terms of the lengthwise direction of the sensor unit 40 as well as the widthwise direction. The contacting member 45 is a component for regulating the sensor unit 40 in the distance between the original placement glass platen 11 and image sensor 46. By the way, this embodiment is not intended to limit the present invention in the choice of the contacting member 45. That is, the contacting member 45 may be different in shape from the one in this embodiment. For example, it may be in the form of a roller.

Next, referring to FIGS. 2 and 3(a), the guiding shaft 14 is disposed so that it extends in a secondary scan direction (indicated by arrow mark S), which is perpendicular to a primary scan direction of the image sensor 46. It is in engagement with a flange portion 12a of the guide frame 12. The guide frame 12 supports the sensor unit 40. The timing belt 15 is rotated by the driving force from a motor 16. As the timing belt 15 is rotated, the guide frame 12 and sensor unit 40 moves together in the secondary scan direction S along the back surface of the original placement glass platen 11, with the points of contact of the contacting member 45 remaining in contact with the fixation surface of the frame 13.

Next, an original reading operation of the image reading portion 10 is described.

First, an original D is to be placed on the original placement surface of the original placement glass platen 11. Then, as a reading start signal is outputted, the motor 16 begins to drive the sensor unit 40, causing the sensor unit 40 to move in the secondary scan direction (indicated by arrow mark S in FIG. 3).

At the same time, the image sensor 46 begins to illuminate the original D with its LED 42, and focus the light reflected by the original D, on the light sensing element 44 with the use of the cylindrical lens 43. That is, the image sensor 46 reads the information of the original D, in terms of the primary scan direction, as line data.

Thereafter, as the sensor unit 40 is moved in the secondary scan direction S, the image sensor 46 repeats the above described action with preset amount of interval. Consequently, the information of the original D, the amount of which is equivalent to the entirety of the original D, is obtained.

<Air Passage>

Next, referring to FIG. 2, an air passage 50 for cooling the image sensor 46 is described.

Referring to FIG. 2, the bottom portion of the image reading portion 10 is provided with an air intake opening 51 and an air exhaust opening 52; in terms of the primary scan direction of the image sensor 46, the end walls of the frame 13 are provided with the air intake opening 51 and air exhaust opening 52, one for one. The air intake opening 51 is the opening through which the ambient air is taken into the image reading portion 10 in the direction indicated by an arrow mark C1. As the ambient air is taken into the image reading portion 10 through the air intake opening 51, it moves through the air passage 50, and is exhausted out of the image reading portion 10 through the air exhaust opening 52 in the direction (indicated by an arrow mark C2).

Further, the image reading portion 10 is provided with a cooling fan 53, which is in the adjacencies of the air exhaust opening 52. This cooling fan 53 draws the ambient air into the image portion 10 through the air intake opening 51 in the direction indicated by the arrow mark C1, and guides the air out of the image reading portion 10 in the direction (indicated by arrow mark C2) through the air exhaust opening 52.

The image reading portion 10 is structured so that, in terms of the primary scan direction which is parallel to the axial line of the image sensor 46, the air passage 50 overlaps with the entirety of the moving range of the image sensor 46. Since the image reading portion 10 is structured so that the air passage 50 is configured and positioned as described above, it is possible to cool the image sensor 46 across the entire range of the image sensor 46 in terms of the primary scan direction of the image sensor 46 as the image sensor 46 is increased in temperature by the effect of the light generation of the image sensor 46 and heat H generated by the fixing device 24. Therefore, it is possible to prevent the image sensor 46 from becoming nonuniform in temperature in terms of the primary scan direction. Therefore, it is possible to prevent the nonuniform thermal expansion of the image sensor 46 in the primary scan direction. Therefore, it is possible to prevent the problem that the image reading portion 10 is reduced in the level of accuracy at which it can read an original D, by the above described nonuniform thermal expansion of the image sensor 46 in the primary scan direction.

The image reading portion 10 in this embodiment can be operated in the mode in which it reads an original D placed statically on the original placement glass platen 11, and also, in the mode in which the image sensor 46 is kept in its home position, and reads an original D while the original is moved relative to the image sensor 46. The home position of the image sensor 46 is the one shown in part (a) of FIG. 3. As for the positioning of the cooling fan 53 in terms of the secondary scan direction S, it is roughly the same as the home position of the image sensor 46.

Further, the image reading portion 10 is provided with multiple air intake openings 51. That is, one of the air intake openings 51 is disposed in the adjacencies (where ambient air is made to flow into image reading portion 10 in the direction indicated by arrow mark C1) of the home position of the image sensor 46, whereas the others are distributed across the secondary scanning range of the image sensor 46 (so that ambient air is made to flow into image reading portion 10 as indicated by arrow marks C4).

Further, the image forming apparatus A is structured so that the air passage 50 is between the image reading portion 10 and fixing device 24 of the image forming apparatus A. Thus, it is possible to prevent the problem that the image sensor 46 is increased in temperature by the effect of the heat H generated by the fixing device 24.

Further, the air intake opening 51 is positioned farther from the fixing device 24 than the air exhaust opening 52. Therefore, it is possible to prevent the problem that the air taken into the image reading portion 10 through the air intake opening 51 is increased in temperature by the effect of the heat H generated by the fixing device 24. Therefore, it is possible to ensure that the air which is taken into the air passage 50 is low enough in temperature to cool the image sensor 46. Further, as the air in the image reading portion 10 is increased in temperature by the heat H, the air can be exhausted through the air exhaust opening 52. Thus, the image reading portion 10 can be more effectively cooled.

By the way, in a case where the position of the image sensor 46 coincides with the position of the fixing device 24 in terms of the primary scan direction of the image sensor 46, the image sensor 46 is more likely to become nonuniform in temperature in terms of its primary scan direction than the other directions. In this embodiment, however, the air intake opening 51 is positioned farther from the fixing device 24 than the air exhaust opening 52. Therefore, it is possible to prevent the occurrence of this type of nonuniformity in temperature.

Further, the image reading portion 10 is provided with a partition wall 54 (partitioning member) which partitions the space in which the optical portion which includes the image sensor 46, original placement glass platen 11, and the like, from the air passage 50 from the air intake opening 51 to the air exhaust opening 52. Therefore, it is possible to prevent the problem that the image reading portion 10 is reduced in accuracy by the foreign substances such as dust which enter the image reading portion 10 through the image reading portion 10 from outside the image reading portion 10.

By the way, the air intake opening 51 may be provided with a dust filter (filtering member). With the air intake opening 51 being fitted with a dust filter, it is possible to prevent the problem that the image reading portion 10 is reduced in accuracy by foreign substances such as dust which enter the image reading portion 10 through the air intake opening 51.

Embodiment 2

Next, the image forming apparatus A equipped with the image reading portion 10 in the second embodiment of the present invention is described with reference to the drawings. The portions of the image reading portion 10 and its image reading apparatus, the description of which will be the same as that of the counterparts in the first embodiment, are given the same referential codes as those given to the counterparts in FIGS. 1-3, and are not described here.

FIG. 4 is a schematic sectional view of the image reading portion 10 in this embodiment, and its adjacencies, when the image reading portion 10 is closed. FIG. 5 is a schematic sectional view of the image reading portion 10 in this embodiment, and its adjacencies, when the image reading portion 10 is open.

Referring to FIGS. 4 and 5, the image reading portion 10 in this embodiment is provided with an air intake opening 51, which is for taking the ambient air into the image reading portion 10 in the direction indicated by an arrow mark C1. In this embodiment, however, it is the main assembly of the image forming apparatus A that is provided with an air exhaust opening 52, which is for exhausting the air taken into the image reading portion 10, out of the apparatus 10 in the direction indicated by an arrow mark C2. Further, the image forming apparatus A is structured so that when the image reading portion 10 is remaining closed, an air passage 50 keeps the interior of the main assembly of the image forming apparatus A in connection to the interior of the image reading portion 10.

Further, the main assembly of the image forming apparatus A is provided with a cooling fan 53, which is in the adjacencies of the air exhaust opening 52 of the main assembly of the image forming apparatus A. This cooling fan 53 draws the ambient air into the image reading portion 10 through the air intake opening 51 in the direction indicated by an arrow mark C1, and guides the air through the image reading portion 10 outward (indicated by arrow mark C2) of the main assembly of the image forming apparatus A through the air exhaust opening 52.

Further, the image forming apparatus A is structured so that, in terms of the primary scan direction of the image sensor 46, the air passage 50 overlaps with the entire scanning range of the image sensor 46. Because the image reading portion 10 is structured as described above, as the image sensor 46 is increased in temperature by the effect of the light emission or the like of the LED 42, it can be cooled across its entire range in terms of the primary scanning direction of the image sensor 46. Therefore, it is possible to prevent the problem that the image sensor 46 becomes nonuniform in temperature in terms of its primary scan direction, and therefore, becomes nonuniform in the amount of thermal expansion. Therefore, it is possible to prevent the problem that the image reading portion 10 is reduced in accuracy by the nonuniform expansion of the image sensor 46 attributable to the above described causes.

Further, in this embodiment, the image reading portion 10 is structured so that the air passage 50 is routed through the adjacencies of the fixing device 24 of the main assembly of the image forming apparatus A. Therefore, this embodiment is more effective to prevent the problem that the image sensor 46 is increased in temperature by the heat H generated by the fixing device 24, than the first embodiment.

Further, the image forming apparatus A is structured so that the air passage 50 is in the adjacencies of the two sided image formation sheet passage 26 for the two-sided image formation. Therefore, it is possible to cool a sheet P of recording medium before an image is formed on the second side (surface) of the sheet P in an operation for forming an image on both surfaces of the sheet P, and also, it is possible to minimize the main assembly of the image forming apparatus A (which includes the image forming portion) in the amount of temperature increase. Further, the image forming apparatus A is structured so that airflow is generated in the two-sided image formation sheet passage 26. Therefore, it is possible to prevent the two-sided image formation sheet passage 26 from suffering from condensation.

Further, it is the main assembly of the image forming apparatus A (apparatus main assembly) that is provided with the cooling fan 53. Thus, the image reading portion 10 in this embodiment is lighter than the image reading portion 10 in the first embodiment, being therefore easier to open or close than the image reading portion 10 in the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-084557 filed on Apr. 20, 2016, which is hereby incorporated by reference herein in its entirety.

What is claimed is:

1. An image forming apparatus comprising:
    a printer unit configured to form a toner image on a recording material, said printer unit including a fixing portion configured to fix the toner image on the recording material;
    a reader unit provided above said printer unit and configured to read an image of an original, said reader unit including an image sensor configured to optically read the original;
    wherein in a side of said reader unit opposed to said printer unit, there are provided a suction opening configured to suck air from an outside of said reader unit and a discharging opening configured to discharge the air to an outside of said reader unit, and
    wherein an air flow path connecting said suction opening and said discharging opening overlaps with an entirety of said image sensor in a longitudinal direction of said image sensor so that air can flow in the longitudinal direction of said image sensor.

2. An apparatus according to claim 1, wherein said suction opening is disposed at a position more remote from said fixing portion than said discharging opening.

3. An apparatus according to claim 1, wherein said reader unit includes a fan configured to take in air from an outside of said apparatus through said suction opening and to discharge the air to an outside of said apparatus through said discharging opening.

4. An apparatus according to claim 3, wherein said image sensor is operable in a mode in which said image sensor is movable in a sub-scan direction perpendicular to the longitudinal direction and in which said image sensor reads a stationary original while moving in the sub-scan direction, and a mode in which said image sensor reads a moving original while said image sensor is kept in a home position, wherein said fan is disposed substantially at the same position as the home position in the sub-scan direction.

5. An apparatus according to claim 1, further comprising a partition wall fixed on a frame of said reader unit and configured to partition between said air flow path and said image sensor configured to partition between said air flow path and said image sensor.

6. An image forming apparatus comprising:
a printer unit configured to form a toner image on a recording material, said printer unit including a fixing portion configured to fix the toner image on the recording material;
a reader unit provided above said printer unit and configured to read an image of an original, said reader unit including an image sensor configured to optically read the original;
wherein in a side of said reader unit opposed to said printer unit, there are provided a suction opening configured to suck air from an outside of said reader unit,
wherein said printer unit is provided with a discharging opening configured to discharge the air to an outside of said reader unit,
wherein an air flow path connecting said suction opening and said discharging opening overlaps with an entirety of said image sensor in a longitudinal direction of said image sensor.

7. An apparatus according to claim 6, wherein said suction opening is disposed at a position more remote from said fixing portion than said discharging opening.

8. An apparatus according to claim 6, wherein said reader unit includes a fan configured to take in air from an outside of said apparatus through said suction opening and to discharge the air to an outside of said apparatus through said discharging opening.

9. An apparatus according to claim 8, wherein said image sensor is operable in a mode in which said image sensor is movable in a sub-scan direction perpendicular to the longitudinal direction and in which said image sensor reads a stationary original while moving in the sub-scan direction, and a mode in which said image sensor reads a moving original while said image sensor is kept in a home position, wherein said fan is disposed substantially at the same position as the home position in the sub-scan direction.

10. An apparatus according to claim 6, further comprising a partition wall fixed on a frame of said reader unit and configured to partition between said air flow path and said image sensor configured to partition between said air flow path and said image sensor.

11. An image reader usable with a printer unit for forming a toner image on a recording material, the printer unit including a fixing portion configured to fix a toner image on the recording material, said image reader comprising,
a reader unit for being placed above the printer unit and configured to read an image of an original, said reader unit including an image sensor configured to optically read the original; and
a suction opening provided in a side of the reader unit and configured to suck air from an outside of said reader unit and a discharging opening configured to discharge the air to an outside of said reader unit,
wherein an air flow path connecting said suction opening and said discharging opening overlaps with an entirety of said image sensor in a longitudinal direction of said image sensor so that air can flow in the longitudinal direction of said image sensor.

12. An image reader according to claim 11, wherein said suction opening is disposed at a position more remote from the fixing portion than said discharging opening.

13. An image reader according to claim 11, wherein said reader unit includes a fan configured to take in air from an outside of said image reader through said suction opening and to discharge the air to an outside of said image reader through said discharging opening.

14. An image reader according to claim 13, wherein said image sensor is operable in a mode in which said image sensor is movable in a sub-scan direction perpendicular to the longitudinal direction and in which said image sensor reads a stationary original while moving in the sub-scan direction, and a mode in which said image sensor reads a moving original while said image sensor is kept in a home position, wherein said fan is disposed substantially at the same position as the home position in the sub-scan direction.

15. An image reader according to claim 11, further comprising a partition wall fixed on a frame of said reader unit and configured to partition between said air flow path and said image sensor.

* * * * *